United States Patent [19]

Ichihara et al.

[11] Patent Number: 6,014,296
[45] Date of Patent: Jan. 11, 2000

[54] MAGNETIC DISK, METHOD OF MANUFACTURING MAGNETIC DISK AND MAGNETIC RECORDING APPARATUS

[75] Inventors: Katsutaro Ichihara; Akira Kikitsu, both of Yokohama; Kohichi Tateyama, Ichikawa, all of Japan

[73] Assignee: Kabushiki Kaisha Toshiba, Kawasaki, Japan

[21] Appl. No.: 08/681,409

[22] Filed: Jul. 23, 1996

[30] Foreign Application Priority Data

Jul. 24, 1995 [JP] Japan ................................ 7-187313
Jul. 27, 1995 [JP] Japan ................................ 7-192015

[51] Int. Cl.⁷ .......................... G11B 5/82; G11B 23/00
[52] U.S. Cl. .................................. 360/135; 428/694 TM
[58] Field of Search ........................ 360/135; 369/275.3, 369/275.5, 283, 286, 288; 428/694 T, 694 TP, 694 TR, 694 TM, 900

[56] References Cited

U.S. PATENT DOCUMENTS 5,180,609  1/1993  Nakamura et al. ..................... 427/595

FOREIGN PATENT DOCUMENTS 2-189715  7/1990  Japan .
2-201730  8/1990  Japan .
5-205257  8/1993  Japan .

*Primary Examiner*—George J. Letscher
*Attorney, Agent, or Firm*—Oblon, Spivak, McClelland, Maier & Neustadt, P.C.

[57] ABSTRACT

A magnetic disk including a substrate, a recording track section which is made of a magnetic member for recording and reproducing information magnetically and is provided on the substrate, and a guard band member which is provided between the recording track sections adjacent to each other so that they are substantially continued in a track direction and is harder than the magnetic member and is made of a non-magnetic material. Moreover, the magnetic member is not provided or magnetic members with a different thickness from the magnetic member forming the recording track section is provided on a lower area of the guard band member.

10 Claims, 4 Drawing Sheets

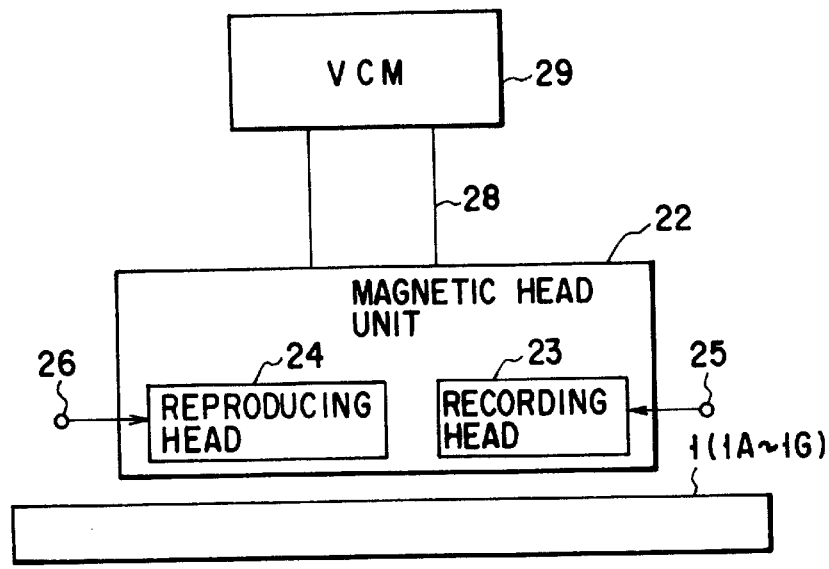
FIG. 12
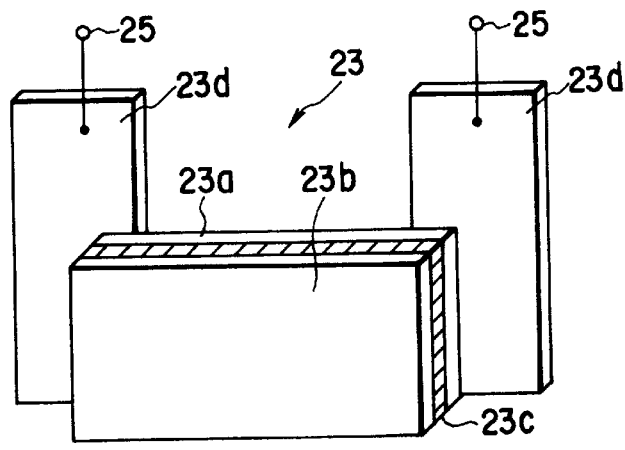
FIG. 13    TRACK WIDTHWISE DIRECTION
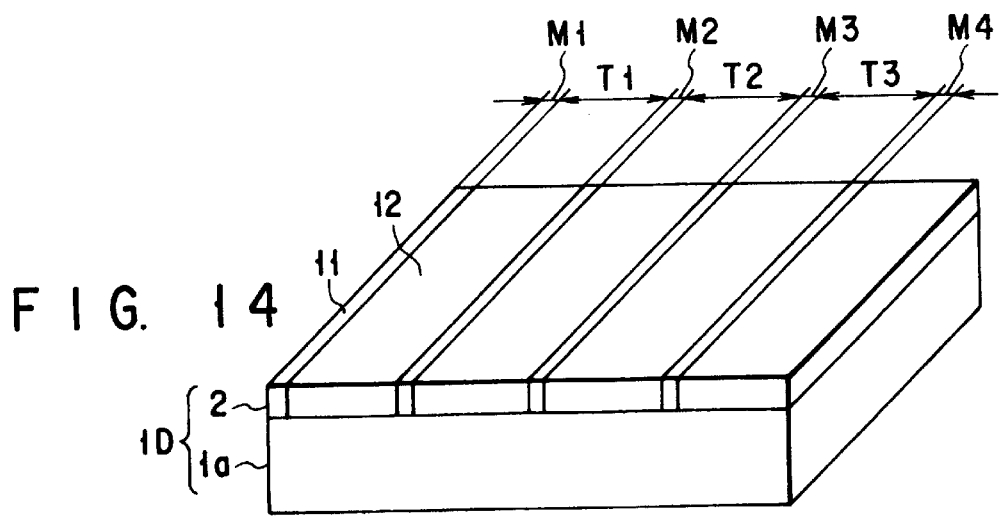
FIG. 14

MAGNETIC DISK, METHOD OF MANUFACTURING MAGNETIC DISK AND MAGNETIC RECORDING APPARATUS

BACKGROUND OF THE INVENTION

1. Field of the Invention

The present invention relates to a magnetic disk which is mainly used in a computer peripheral memory, a method of manufacturing a magnetic disk and a magnetic recording apparatus.

2. Description of the Related Art

A magnetic disk has features such as high recording density, high data transfer speed, high-speed access, high reliability and low price, and it is the mainstream of computer peripheral memory. The recording density of a magnetic disk has increased a dozen times over the past ten years, so it is expected to continue to be improved.

The principle of magnetic recording is such that a string of recording magnetic domain domains are formed in a magnetic recording layer by a signal magnetic field generated from a magnetic head so that recording is performed. The signal magnetic field which is leaked from a string of the recording magnetic domains to the outside of the recording layer is reproduced by the magnetic head. In order to improve the recording density, the recording magnetic domains to be formed in the magnetic recording layer are to be made minute as possible, and a microscopic magnetic field which is leaked from a minute recording magnetic domain is reproduced at as high a density as possible.

In order to make the recording magnetic domain minute, it is important that first, the point of the magnetic head which is closest to the magnetic recording layer is made minute, more specifically, a recording (reproducing) magnetic gap is made narrow and a width of a magnetic pole track is made narrow. Secondly, a space between the top of the magnetic head and the magnetic recording layer is made narrow. Thirdly, fringing of the fringe of the recording magnetic domain due to a magnetic field dispersing from the point of the magnetic head spatially is lowered as much as possible. Fourthly, the point of the magnetic head is located in a prescribed recording/reproducing position of the magnetic recording layer as accurately as possible.

In addition, a break-through in reproducing principles is required for reproducing a microscopic magnetic field from a minute recording magnetic domain at high density. In recent years, a reproducing principle utilizing a magnetoresistance effect which is different from a conventional induction reproducing principle has been suggested and demonstrated, and a material having a big magnetoresistance effect has been researched and developed. Therefore, this principle is considered to be a mainstream of reproduction of a microscopic magnetic field.

The above-mentioned technical points of higher recording/reproducing density are common to a head floating-type recording/reproducing method (induction reproducing-type) using a longitudinal medium applied to current magnetic recording and to a head contact-type recording/reproducing method (magnetoresistance reproducing type) using a perpendicular medium.

Conventionally, examples of means of reducing the fringing are a means for reducing a fringe magnetic field from a head by narrowing a space and a means for reducing a width of magnetization transition in a recording layer. However, since it is impossible to eliminate fringing in a conventional magnetic disk from a viewpoint of the principle, a track should have enough width in expectation of a certain fringe value. This hinders the narrowing of a track.

In addition, after a magnetic recording disk and a magnetic head are mounted on a drive, a magnetic servo signal and address signal are recorded in a recording layer by using a servo writer, and the head is located by using the servo information during the actual operation. However, the tracking accuracy is limited to mechanical accuracy of the head as long as the magnetic recording layer has a simple continuous plane. This also hinders the narrowing of a track.

Japanese Laid-Open Patent Application No. 2-201730 discloses techniques for achieving tracking with high accuracy. With this technique, physical unevenness is previously provided to a magnetic disk substrate and a magnetic recording layer is formed thereon, and a track is servo-controlled by utilizing a difference between a signal from a concave section and a signal from a convex portion. In such a PERM (Pre-Embossed Rigid Magnetic) disk, the tracking accuracy is determined according to accuracy of the physical unevenness of the substrate, and high accuracy such that fluctuation quantity is about 0.01 $\mu$m order can be realized by providing convex and concave section according to a process of an optical disk substrate.

However, in the PERM disk, since a member composing a guard band is made of a soft resist, only the resist is liable to wear selectively. In order to prevent the wear, it is required to coat the surface of the disk with a protective film, and as a result, it is hard to narrow a space. Therefore, synthetically, this is not a high-accuracy technique.

Japanese Laid-Open Patent Application No. 2-189715 discloses a magnetic recording medium in which an organic thick film such as a resist is provided on a substrate, and physical unevenness is provided on the surface of the organic film by pressing an uneven stamper against the organic film, etc. A magnetic thin film is buried in the concave section, and the organic film and the magnetic film essentially form a plane. In this magnetic recording medium, since the organic film exists below the magnetic film, a thick interface invalid layer is formed below the magnetic film. As a result, in order to obtain a magnetic film having a prescribed characteristic, the thickness of the magnetic film should be thick, so the high-resolution recording is difficult. Therefore, this is not a high density technique. Moreover, in this conventional technique, since a high permeable film cannot be provided below the recording magnetic film, it is difficult to apply this technique to perpendicular magnetic recording which is expected to be a future high density recording technique.

In addition, Japanese Patent Application No. 5-205257 suggests a technique of implanting ions into an area between recording tracks of a magnetic recording layer, projecting a laser beam or the like thereto so as to eliminate a recording function and forming a guard band. However, in this conventional technique, since an affected zone of a recording layer is used as the guard band, it is difficult to form a uniform guard band. Moreover, there arises a problem that a boundary between the recording track and the guard band becomes unclear.

The "magnetoresistance effect" is a phenomenon such that an electric resistance value of a magnetic thin film used for reproduction is changed based on a relative angle between a direction of a current and a direction of magnetization of the reproducing magnetic substance. Compared with conventional induction reproduction, this effect has advantages such that reproducing sensitivity is very high and reproduced signal strength does not depend on a head running speed.

As magnetic substances to be used as a magnetoresistance head, four kinds of substances are provided:

an NiFe monolayer film utilizing anisotropy magnetoresistance effect; a CoFe/Cu/CoFe triple layer film having a spin valve structure in which an electrically conductive non-magnetic film is sandwiched between two magnetic thin films; NiFe/Ag having a granular structure in which magnetic grains are dispersed in an electrically conductive non-magnetic member; and a (Co/Cu)n film having a magnetic artificial multi-layer structure in which a lot of magnetic thin films and a lot of electrically conductive non-magnetic thin films are alternately laminated.

As to the film of a monolayer structure in the above substances, since elements can be formed comparatively in a simple manner, it has a practical use, but a change rate of resistance is 2% at most. Therefore, in the case where recording magnetic domains are made more minute, namely, a reproducing magnetic field is made minute, and the film of a monolayer structure is insufficient from a viewpoint of reproducing sensitivity.

In addition, the granular structure and the magnetic artificial multi-layer structure show a change rate of resistance of not less than dozens %, so they are expected to be used very much in the future. However, since a strong magnetic field of several kOe—dozens kOe is required for obtaining a great changing rate of resistance, the reproduction of a very weak medium magnetic field is difficult using this technique.

Therefore, the spin valve structure, which shows a small change in a magnetic field of less than several hundred Oe and a changing rate of resistance of about 10% becomes sufficiently practical, the center of public attention, and it is expected to be put to practical use as a next reproducing element in the monolayer film structure. The reproducing principle in the spin valve structure is that electric resistivity is changed according to a relative direction of magnetization in two magnetic thin films. While one magnetization direction of the magnetic thin film is fixed, the other magnetization direction of the magnetic thin film is aligned in the direction of a medium magnetic field so that a relationship of the relative magnetization direction between the two magnetic thin films is changed. In order to fix the magnetization of one magnetic thin film, a magnetic film with a high coercive force as a magnetization sticking film is exchange-coupled to the magnetic thin film so as to obtain a magnetization fixing film. Since the magnetization of the other magnetic thin film is rotated and aligned in that of a medium magnetic field, hereinafter, this film is referred to as "magnetization rotating film". In order to obtain symmetry of a reproduced signal, it is important that the direction of the magnetization of the magnetization rotating film intersect perpendicularly to the direction of the magnetization of the magnetization fixing film without a medium magnetic field. Therefore, in accordance with the relationship of the direction of the medium magnetic field, it is preferable that the magnetization direction of the magnetization fixing film is set so as to be arranged (1) in the same direction of the medium magnetic field, namely, the direction which is perpendicular to the medium surface, and (2) in a state of no medium magnetic field, the magnetization direction of one magnetization rotating film is arranged in a widthwise direction of the track of the medium.

Some methods have adopted the above technique of setting the magnetization directions of the magnetization fixing film and the magnetization rotating film. A magnetization sticking film is generally used for setting the magnetization direction of the magnetization fixing film, and two methods are suggested for setting the magnetization direction of the magnetization rotating film. First, a method utilizing a magnetic field generated from a sense current is suggested. Secondly, a method of exchange-coupling or magnetostatically coupling a hard film for applying a suitable bias magnetic field to a magnetization rotating film is suggested.

However, in the method using a sense current, a sense current value is defined by a bias magnetic field to be applied to the magnetization rotating film, and accordingly outputs cannot be made large by large currents. Also, since the bias magnetic field for the magnetization rotating film acts upon the magnetization fixing film so as to invert its magnetization direction, it is difficult to obtain operational reliability.

On the other hand, in the method using a hard film bias, a number of manufacturing processes is increased due to the complication of a film structure of the head. Accordingly, it is difficult to provide a head at a low price.

Explanations were given as to the importance of bias at the time of using a magnetoresistance effect element and concrete means by illustrating the spin valve structure. However, in the other structures, using a magnetoresistance effect film, in order to prevent distortion of the waveform, it is important that the rotation of the magnetization is made symmetric with respect to the direction of the medium magnetic field, in practical use. Therefore, in order to use the magnetoresistance effect film, the magnetic field is biased by any means.

SUMMARY OF THE INVENTION

It is an object of the present invention to provide a magnetic disk which can reduce a side fringe of a recording magnetic domain and can improve locating accuracy of a magnetic head at the time of narrow spacing and to provide a manufacturing method thereof.

In addition, it is an object of the present invention to provide a magnetic disk which makes it possible to set a thickness of a recording magnetic film so that high-resolution recording can be performed and which can be applied to future perpendicular magnetic recording or contact recording, and in particular which is suitable for a magnetoresistance effect-type recording head, and to provide a manufacturing method thereof.

In addition, it is an object of the present invention to provide a magnetic disk which makes it possible to make a large sense current flow to a magnetoresistance effect-type recording/reproducing head, to obtain operational reliability of a head and to manufacture a head at a low price, and to provide a manufacturing method thereof.

In addition, it is an object of the present invention to provide a magnetic disk which makes it possible to perform narrow spacing recording or contact recording in which a side fringe is lessened and a tracking servo characteristic is constant, and to provide a manufacturing method thereof.

In addition, it is an object of the present invention to provide a magnetic recording apparatus which makes large capacity and high-density recording possible.

These and other objects are achieved in the present invention by providing a magnetic disk including a substrate, a recording track section which is made of a magnetic member for recording and reproducing information magnetically and is provided on the substrate, a guard band member which is provided between the recording track sections adjacent to each other so that they are substantially continued in a track direction and is harder than the magnetic member and is made of a non-magnetic material. Moreover, the magnetic member is not provided or magnetic members with a different thickness from the magnetic member forming the recording track section is provided to a lower area of the guard band member.

In another aspect of the present invention a method of manufacturing a magnetic disk, includes the steps of:

(a) forming a magnetic layer made of a magnetic material on a substrate with a substantially plane surface;

(b) patterning a guard band space which specifies adjacent recording track sections so that they are substantially continued in a track direction by removing a portion of the magnetic layer;

(c) filling the guard band space with a guard band member which is made of a non-magnetic material and is harder than the magnetic material of the magnetic layer; and (d) processing the surfaces of the guard band member and the magnetic layer so that they are substantially plane.

The above guard band member is not limited as long as it appears on the disk surface, so its thickness may have the same thickness of the magnetic member, may be larger or may be smaller than the magnetic member.

In addition, it is desirable that the guard band member is made of a non-magnetic hard material, and it is preferable it is made of oxide such as $SiO_2$, $Al_2O_3$ and $TiO_2$, silicon such as $Si_3N_4$, AlN and TiN, carbide such as TiC, boride such as Bn or C, CH or CF polymeric compound. Since the guard band member is non-magnetic, a problem of a side fringe is solved almost completely. Moreover, since the guard band member is harder than the magnetic member, the contact start/stop (CSS) resistivity is excellent, and durability is excellent in the future contact recording method.

In the magnetic disk of the present invention, the magnetic member shows a minute physical change in shape, namely, it is uneven. It is desirable that the guard band member is buried into the concave section of the magnetic member until it meets the surface of the convex section of the magnetic member, and the disk surface is substantially plane. The unevenness of the magnetic member is important, and it is preferable that the magnetic members are provided so as to be substantially continued in the recording track direction in order to decrease a side fringe and to perform the tracking operation with high accuracy. When the guard band member has such an arrangement, the problem of the side fringe is substantially solved and simultaneously, the tracking operation with high accuracy which is similar to an optical disk is possible.

Here, "substantially continued" means that the guard band member is not always continued over one round of the track, and it is acceptable as long as the guard band is continued over a recording magnetic domain string forming section or a magnetic servo information recording section provided if necessary in the track direction. The more preferable unevenness is such that an address signal is recorded as information of the change in the shape of the recording magnetic layer in addition to the arrangement that the guard band members are substantially continued in the track direction. This arrangement is provided if it is required besides the arrangement the guard band members are approximately continued in the track direction. With this arrangement, the servo writing which has been conventionally performed is not required at all.

In addition, the important result of the present invention, with respect to high density recording, is such that recording resolution is improved, namely, linear recording density is improved. This is because when the recording magnetic members are separated by the non-magnetic guard band members per recording track section, shape magnetic anisotropy is applied to the recording track direction, and a fluctuation in the reproduced signal in the magnetization transition section becomes small.

If the guard band member which is buried in the uneven section of the recording magnetic member is substantially level with the surface of the magnetic member, an antifriction protective layer is not necessarily provided in the recording layer. This is most preferable arrangement in order to decrease loss of spacing. In the case where the magnetic head contact-tracks on the recording surface of the disk, the guard band member functions as a guide rail which guides the magnetic head. When the recording magnetic member is exposed, and thus sufficient reliability cannot be obtained, a protective layer may be provided. It is desirable that the protective layer is a hard non-magnetic member made of the same material as the guard band member.

In addition, it is desirable that the electric resistance of the guard band member is higher than the electric resistance of the magnetic member. In the case where the recording/reproducing operation adopting the magnetoresistance effect method is considered, it is preferable that the guard band member has higher electrical insulation than the recording magnetic member. Moreover, it is preferable that the ratio resistance value is larger at least by a figure than the recording magnetic member. As a result, even in the case where the contact reproducing operation is performed by the magnetoresistance head of the transverse energizing method, a problem such as current leaks into the medium resulting in lowered reproducing output can be also solved.

As the magnetic member, a Co material used in the normal magnetic disk, such as CoNiPt, CoPt, CoPtCr, CoTaCr, CoNiCr, CoCr expected as a future perpendicular magnetic recording material and CoPtO, Ba ferrite material, being studied as a contact recording material because it is hard, a material, etc. in which Fe or Co or Fe based alloy or Co based alloy grains are dispersed in hard matrix can be used.

Here, a substrate may be directly arranged on a ground of the recording magnetic member, but it is preferable that an NiP, Cr-oriented control film, etc. is formed in an inplane medium, and a high permeability film, which is a closed magnetic circuit forming medium, such as an NiFe film is formed in a perpendicular medium. The material of the substrate is not particularly limited, but generally, aluminum or glass is used. Moreover, it is preferable that a glass substrate with excellent chemical resistance is used.

In another aspect of the present invention there is provided a magnetic disk including:

a substrate;

a recording track section made of a magnetic member for recording and reproducing information magnetically, the recording track sections being provided on the substrate; and a magnet member for applying a DC current magnetic field to outside, said magnet member being provided between the adjacent recording track sections so that they are substantially continued in a track direction, the magnet member being made of a material which is magnetically different from the magnetic member forming the recording track section.

In another aspect of the present invention a method of manufacturing a magnetic disk includes the steps of: (A) forming a magnetic layer made of a magnetic material on a substrate with a substantially plane surface; (B) patterning a space which specifies adjacent recording track sections so that they are substantially continued in a track direction by removing a portion of the magnetic layer; (C) filling the space with a magnet member which is made of a magnetically different material from the magnetic material and which applies a DC current magnetic field to the outside; and (D) processing the surfaces of said magnet member and the magnetic layer so that they substantially become plane.

"They are substantially continued in a track direction" means that the magnetic member exists at least the recording/reproducing section of an information signal. Therefore, an address information region and a servo information region may or may not exist, so they are arbitrary.

In addition, address information and servo information may be provided by a magnet member pattern, and in this case, such portions on the magnetic member are not necessarily continued substantially.

Generally the direction of DC current magnetic field generated from the magnet member to the outside (head direction) is parallel to the recording track which is parallel to the medium surface, but in the case where the magnetoresistance reproducing element vertical energizing method is used, it is preferable that a DC current magnetic field is generated perpendicularly to the medium surface.

In addition, the magnetic disk may have a ground layer, a protective layer, a lubricant layer, etc. if necessary. It is desirable that a Co—P or Co—Ni—P plating film, a Co—Ni vapor deposition film, or a Co sputtering film such as a Ba ferrite sputtering film, Co—Pt, Co—Cr, Co—Ni—Cr, Co—Cr—Ta or Co—Ni—Pt is used as the magnetic member.

The magnetic member may be made of any material as long as it has a large coercive force such that the magnetization direction is not changed by the recording medium of the magnetic head. The strength of the generated magnetic field is important, it can be adjusted by a size (width and film thickness) of the magnet member and by providing a soft magnetic film to the ground of the magnet member besides the value of the magnetization of the magnet member (a value depends on a material characteristic and a manufacturing method). For example, a bulk magnet material such as ferrite, SmCo and NdFeB may be made thin so as to be a film formed as the magnet member, and a high coercive form thin film material, which is mainly used in an magneto-optical recording medium, such as Pt/Co multi-layer film, MnBi, TbCo, TbFeCo, may be used.

In another aspect of the present invention there is provided a magnetic recording apparatus including:

a magnetic head for writing and reading information magnetically to a magnetic disk having a substrate, a recording track section made of a magnetic member for recording and reproducing information magnetically, the recording track section being provided on the substrate, a guard band member provided between the recording track sections adjacent to each other so that they are substantially continued in a track direction, the guard band member being harder than the magnetic member and being made of a non-magnetic material, wherein the magnetic member is not provided or magnetic members with a different thickness from the magnetic member forming the recording track section is provided to a lower area of the guard band member; and a control section for processing writing and reading information transmitted from an external apparatus as data so as to transmit the processed information as data to the magnetic head through a read/write circuit, wherein the magnetic head includes a spin valve-type magnetoresistance element, wherein the spin valve-type magnetoresistance element includes:

a first magnetic layer whose magnetization is fixed in a perpendicular direction to the magnetic disk surface, the first magnetic layer being connected to the read/write circuit;

a second magnetic layer whose magnetization is changed by an applied magnetic field; and a non-magnetic electrically conductive layer being inserted between said first magnetic layer and said second magnetic layer.

For a fuller understanding of the nature and advantages of the invention, reference should be made to the ensuing detailed description taken in conjunction with the accompanying drawings.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention wherein:

FIG. 12 is a partial enlarged schematic drawing which shows a magnetic head unit and the magnetic disk;

FIG. 13 is a perspective view which schematically shows a main section of a GMR-type magnetic head;

FIG. 14 is a partially cutaway enlarged perspective view of the recording track section of the magnetic disk according to the second embodiment of the present invention;

DESCRIPTION OF THE PREFERRED EMBODIMENTS

Figure 1:
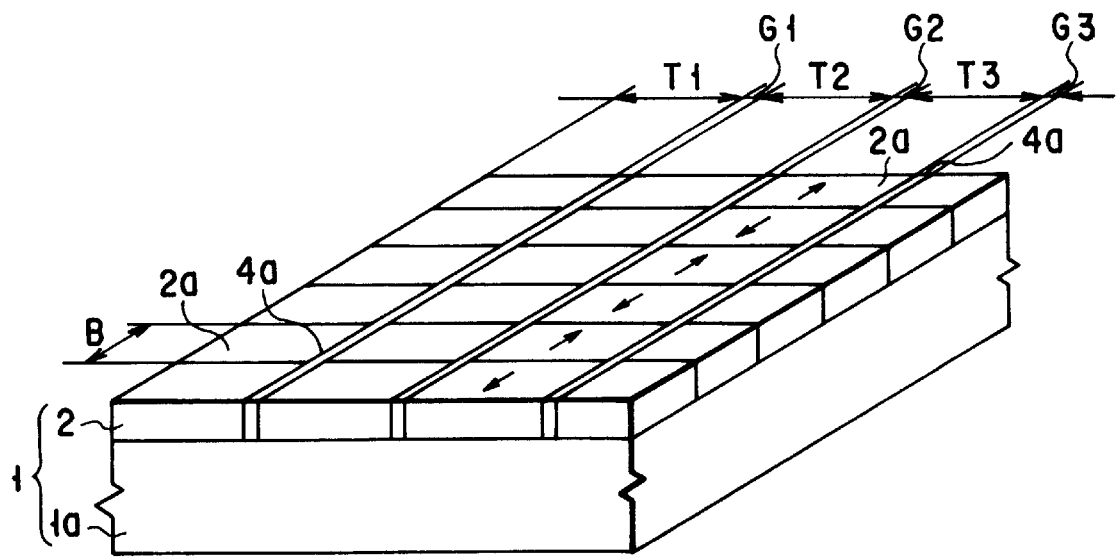
FIG. 1 is a partially cutaway enlarged view in perspective of a recording track section of a magnetic disk according to the first embodiment of the present invention.

Referring now to the drawings, wherein like reference numerals designate identical or corresponding parts throughout the several views, and more particularly to FIG. 1 thereof, there is illustrated an enlarged perspective view which shows a portion of a magnetic disk according to an embodiment of the present invention. In FIG. 1, 1$a$ and 2 respectively represents a substrate and a recording layer. The recording layer 2 includes a band-like recording magnetic member 2$a$ which extends in a recording track direction and a guard band member 4$a$, which is made of different material from the recording magnetic member 2$a$ and is buried in the recording magnetic member 2$a$. In the recording layer 2, the magnetic member 2$a$ and the guard band member 4$a$ are arranged alternately and periodically in a radial direction of a disk under the condition that a track pitch is one period.

When a width of the band-like recording magnetic member 2$a$, i.e., a width of the recording track the guard is represented by T, a width of the band-like guard band member 4$a$, i.e., a width of band by G and a length of a recording magnetic domain by B, a track pitch is (T+G), an effective area of the recording magnetic domain corresponding to a reciprocal of surface density is (T+G)×B. In the present embodiment, a substrate 1$a$ of 2.5 inches was used, and the width T of the recording track was 1.8+0.1 $\mu$m, and the width G of the guard band was 0.2+0.1 $\mu$m. The above track pitch corresponds to a track pitch such that the side recording density is about 1.5 Gb psi, the recording capacity of 4 sides in two disks is 1.5 GB in the case where an aspect ratio of a recording cell (track pitch/shortest bit pitch) is 10 which is same as the current magnetic recording disk and a zone contact angular velocity (ZCAV) method is adopted as a recording method on a disk.

Next, the following describes a method of manufacturing a magnetic disk with reference to FIGS. 2 through 6.

A cleaned glass disk substrate 1a was placed on a processing table of a multidimensional magnetron sputtering device, and a CoPt (20 atom % Pt) target was sputtered for about 1 minute so that an in-plane magnetization recording magnetic layer 2$a$ with a thickness of about 20 nm was formed. Successively, an $SiO_2$ target was sputtered for 1 minute so that an $SiO_2$ film with a thickness of about 10 nm was formed and it was taken out.

Figure 2:
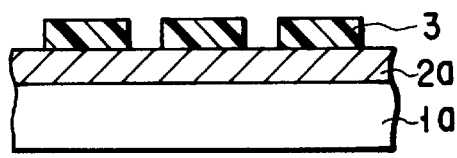
FIG. 2 is a vertical cross sectional view which shows a disk in one step of manufacturing process as an explanation of a manufacturing method of the magnetic disk.

Next, the $SiO_2$ film of the disk was spin-coated with about 50 nm of a positive resist and the photo resist was pre-baked. Thereafter, by using an original cutting device for an optical disk whose light source is a Kr laser, while a disk 1 was being rotated with high accuracy, the resist 3 was exposed under the condition of a track pitch of 2 $\mu$n and an exposing width of 0.2 $\mu$m (width of a guard band section 4$a$ $G_1$, $G_2$, $G_3$, . . . Gn). The time required for exposing the whole surface of the disk was about ten minutes. A coaxially circular resist pattern was formed on the recording layer 2$a$ by developing processing. As shown in FIG. 2, the recording track section 2$a$ of the recording layer 2 is coated with a resist through the $SiO_2$ film, and a portion corresponding to the guard band portion 4$a$ is not coated with the resist but with only the $SiO_2$ film.

Next, the disk 1 having the resist pattern was mounted in an RIE unit, and the $SiO_2$ film was etched by reactive ions only for about 30 seconds by using a $CHF_3$ gas. After the recording layer 2$a$ on the guard band section 4$a$ was exposed, the disk was put into a resist ashing unit, and the resist pattern on the recording track section 2$a$ was removed.

Figure 3:
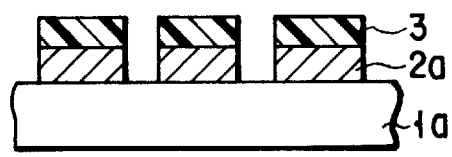
FIG. 3 is a vertical cross sectional view which shows the disk in one step of the manufacturing process as an explanation of the manufacturing method of the magnetic disk.
Figure 4:
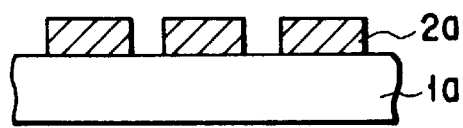
FIG. 4 is a vertical cross sectional section which shows the disk in one step of the manufacturing process as an explanation of the manufacturing method of the magnetic disk.
Figure 5:
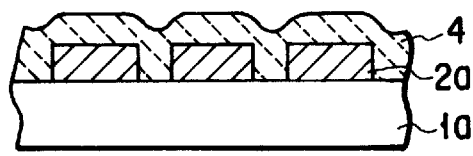
FIG. 5 is a vertical cross sectional section which shows the disk in one step of the manufacturing process as an explanation of the manufacturing method of the magnetic disk.

Next, the disk having the $SiO_2$ film pattern was put into the RIE unit, and the disk was heated to about 200° C., and the CoPt film was etched by reactive ions for about one minute by using mixed gas plasma mainly containing chlorine and boron trichloride. When the surface of the ground substrate was subject to etching so that the pattern was removed, as shown in FIG. 3, a band-like guard band space was formed between the adjacent CoPt recording layers 2$a$. Moreover, as shown in FIG. 4, the resist 3 was removed by the ashing unit.

Figure 6:
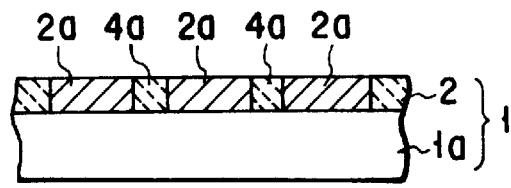
FIG. 6 is a vertical cross sectional view which shows the magnetic disk.

Next, the disk having the guard band space was put into the sputtering device and was sputtered for about two minutes until the guard band space was completely filled. Then, as shown as FIG. 5, the surface of the disk was coated with an $SiO_2$ film. After the disk was taken out and put into an ion polishing device, the surface of the disk was polished for about 30 seconds until the upper face of the recording magnetic member 2$a$ was exposed. At the same time, an $SiO_2$ film 4 having an uneven surface formed on the recording layer was leveled by the ion polishing device. As a result, as shown in FIG. 6, the disk 1 was obtained, with the alternating band-like recording magnetic member 2$a$ and guard band member 4$a$ on its surface.

A portion of the obtained disk 1 is destroyed, and its cross sectional structure was observed by an electron microscope. As a result, as shown in FIG. 1, it was confirmed that the recording magnetic member 2$a$ and the guard band member 4$a$ have a nondifference in level, i.e., substantially level surface.

A total processing time in the present embodiment is increased by such a degree that it can be sufficiently covered by reinforcement of a production facility, and a risk in cost of the disk can be suppressed to a slight degree.

The above embodiment explained the case where the reactive ion etching method is used for patterning the magnetic film, but an ion trimming method can be also used. In this case, it is not required to provide $SiO_2$ on the magnetic film. Namely, after the magnetic film is directly coated with a resist and the resist is exposed by a laser, the magnetic film is patterned by ion trimming so that the resist is removed, and $SiO_2$ is implanted and the magnetic film is ion-polished. However, the accuracy of the processing in the reactive ion etching method is superior.

As a material of a mask or a guard band at the time of patterning the magnetic film, besides $SiO_2$, any material other than a recording magnetic material can be used, but a hard material having excellent insulation is preferable to a recording magnetic material. The manufacturing process is not limited by materials, so for example, when C is used for a mask, a mask can be patterned by using oxygen-based gas.

The magnetic disk of the present invention manufactured by the above-mentioned method was used and an experiment for clarifying the effects of the present invention was made according to the following procedure. Moreover, in order to clarify the effects of the present invention, in the experiment to be discussed, the conventional magnetic recording disk was also manufactured so that both types of magnetic recording disks were evaluated. The two conventional magnetic recording disks were as follows:

(1) a magnetic recording disk which was taken out when the CoPt magnetic layer was formed on the glass substrate by sputtering in the above embodiment (hereinafter, referred to as comparative disk A); and (2) a magnetic recording disk which was taken out when the CoPt recording layer of 20 nm and the $SiO_2$ layer of 10 nm (which functions as a protective layer in the conventional technique) were sputtered (hereinafter, referred to as comparative disk B).

The following explains results of experimenting with the disk according to an embodiment of the present invention (hereinafter, referred to as embodiment disk C) and the comparative disks A and B.

First, as an obtained disk sample and samples manufactured under the same condition, their static magnetic characteristics were measured by a vibrating sample magnetometer (i.e. VSM). Since the disk sample of the present invention has not only a recording magnetic member but also a non-magnetic member, such as a permanent magnet in the recording layer, the net volume of the magnetic member was obtained based upon the results of observation by a cross section electron microscope.

The VSM measurement was made in directions parallel and vertical to the recording track on a film in-plane surface shown in FIG. 1. As a result, in the comparative disks A and B, a significant difference in VSM loop was not observed in the parallel and vertical directions to the track, but in the disk C, the magnetization of the magnetic member of the recording layer has an easy axis which is parallel to the track. This is because the magnetic member has shape anisotropy parallel to the recording track, and it is considered to be preferable for the magnetic recording.

Saturation magnetization of the disk C of the embodiment and the comparative disks A and B were about 650 emu/cc, namely no significant difference was shown among them.

There was no significant difference in coercive force between the comparative disks A and B, namely, the coercive force was about 2 kOe, but it varied with the measuring directions in the disk C of the embodiment. Namely, in the case where a magnetic field was applied to the parallel direction to the track, its value was 2.5 kOe, and in the case where a magnetic field was applied to the vertical direction to the track, the value was 1.5 kOe. These values mean that there was the effect of the shape anisotropy. It is important in magnetic recording with higher density that the coercive force is strong, but since the recording magnetic domains are arranged in the recording track direction, it was clarified that the structure of the magnetic recording disk of the present invention is effective in higher density and in shorter recording wavelength from a viewpoint of the static magnetic characteristic.

Next, 2.5-inch disk for the embodiment and comparison (lubricant was applied thereto) was placed in a magnetic disk test device, and comparative evaluation of the tracking servo accuracy was made and a recording/reproducing operation was performed. As a magnetic head, a transverse energizing magnetoresistance effect reproducing-type thin film head, which was manufactured especially for narrow track operation of the present invention, was used. In order to clarify the effects of the present invention, the track width of the magnetic head in recording and reproducing was 2 $\mu$m, and the flying height in rated rotating operation of the disk C of the embodiment and the comparative disk A was 0.04 $\mu$m, and the flying height of the comparative disk B was 0.03 $\mu$n so that in all the disks, head-media spacing became 0.04 $\mu$m. Moreover, the magnetic head was located in an arbitrary radius on the disk, and a suitable signal was recorded, and a control system, which performs tracking so that a reproduced signal becomes maximum with respect to a mechanical tracking error, was used.

First, the results of the tracking performance test is described. The tracking characteristics of the disk C of the embodiment and the comparative disks A and B after a suitable signal was recorded were substantially equal. Next, a signal was not recorded on an adjacent track but on a next track, and a head was sent to the unrecorded track so that the disk continued to be rotated. As a result, in the comparative disk which obtains a tracking signal only from the magnetic recording signal, a tracking error gradually occurred due to insufficient mechanical rotating accuracy, and a recording signal on an adjacent track was gradually reproduced. In contrast, in the magnetic disk of the present invention, since a magnetic signal output on an nonrecording track was completely different from the guard band section, no tracking error occurred. Therefore, in the magnetic disk of the present invention a tracking servo signal is not required to be previously written when the disk is driven by a drive, and formatting efficiency is improved, and thus a user data capacity is increased. Moreover, since an address signal can be also written while a magnetic film is being patterned in manufacturing the disk, the servo writing is clearly not required.

Next, a side fringe characteristic in the case where recording is performed at a narrow track pitch as shown in FIG. 1 was evaluated by an off-track reproducing operation and over operation. The magnetic head used is the same as in the above-mentioned tracking evaluation. First, after a signal was recorded on a track in a suitable position, while the tracking signal was being offset, it was off-tracked, and a relationship between an offtracking quantity and strength of the reproduced signal was measured. As a result, in the comparative disks A and B, since a 0.2 $\mu$m side fringe, which was observed by a magnetic force microscope (i.e. MFM), occurred on both sides of the head track width, even if the tracking signal was not off-tracked by about 2.2 $\mu$m, the signal output was not stable for a zero level. In contrast, in the disk of the present invention, no side fringe was not observed by the MFM, and signal output was lowered to a zero level on an adjacent track.

In addition, a signal was recorded on adjacent three tracks with a same frequency, and a signal with 1.5-times the frequency was recorded on the middle track, and the over writing characteristic and a cross talk characteristic were examined. As a result, in the comparative disks A and B, signals on the adjacent tracks were picked up, and a sufficient over writing characteristic was not obtained. In contrast, in the disk of the present invention, there existed no signal on the adjacent track, and a sufficient over writing characteristic was obtained. Therefore, the above experiments proved that the disk C of the present embodiment is greatly effective with narrower tracks.

Next, in order to clarify another effect of the present invention, three kinds of disks: the disk C of the embodiment and the comparative disks A and B were subject to a contact start/stop test (i.e. CSS test), so that wear resistivity was examined. In the CSS test, a time (starting time) from starting of the rotation of the disk to the rated rotation was examined, and the state of the disk surface after 50 thousand-path test was examined by observing the disk surface with it being shielded. The comparative disk A not having a protective film but only a lubricant on the flat magnetic film showed such an usual value that the starting time was dozens seconds at about several hundred path, and the comparative disk B, which has the conventional structure that both the protective film and the lubricant are provided, maintained such a normal value that the starting time was about 2.5 seconds after 50 thousand-path.

In contrast, the protective film is not provided on the magnetic film of the present invention, but the disk C of the present embodiment having the $SiO_2$ guard band obtained the same result as the comparative disk B, and as a result of the shielding observation, wear was not particularly observed. Since without the protective layer, the disk C of the present embodiment tracks while the head is being guided by the hard guard band member, this proves that the disk C shows strong wear resistivity which is the same as a disk having the protective film. Therefore, it was confirmed that the disk C was effective with narrower spacing.

In addition, in order to prove superiority in reproduction on the magnetoresistance effective reproducing head, a head load was applied to the electrically conductive reproducing head so that the head contacted the medium surface, and a tracking test was performed. In the comparative disk A, at the moment when the head contacted the medium surface, the strength of the reproduced signal was lowered to not more than half. This was because a divided current flows to the electrically conductive recording layer.

In addition, in the comparative disk B, even if the contact tracking was performed, lowering of the reproduced signal was not observed, but when the test wherein contact operation is continuously performed a series of times, a signal was not generated suddenly. When the magnetic head from which a signal was generated was examined, it was clear that breakdown occurred in the magnetic head. It is considered that this was because since the protective film of the disk is insulating, static electricity was stored by the rotating operation, and the static electricity was concentrated on the head and discharges took place.

Meanwhile, in the disk C of the present embodiment, the strength of the reproduced signal at the time of contact tracking became about 10% lower than at the time of flying, but even if the contact reproducing test was continuously made, breakdown did not occur at all. The lowering of the signal was slighter than the comparative disk A. This is because the electrically conductive recording layer is isolated by the insulating guard band. Since the disk surface is not coated with the insulating protective film completely, the breakdown does not occur.

The above embodiment described the case where CoPt was used as the recording magnetic material, and a ground layer is not provided, but the present invention is not necessarily limited to the type of recording material and the ground substrate, so CoNiPt, CoCrPt, CoTaCr, CoNiCr, CoCr with perpendicular magnetization, etc. can be used as the recording material. Moreover, an NiP plated layer, a Cr-oriented control layer or an NiFe soft magnetic layer, etc. can be used as the ground substrate.

Figure 7:
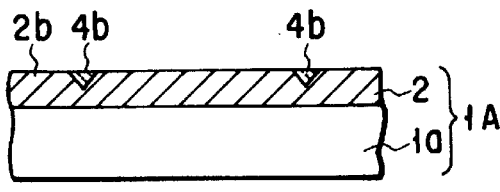
FIG. 7 is a vertical cross sectional view which shows the magnetic disk of another embodiment.

In addition, the guard band member is not limited to ones shown in FIGS. 1 and 6. As shown in FIG. 7, the cross sectional V-shaped guard band member 4b may be provided midway in the magnetic member 2a. Such guard band member 4b controls crystal orientation of the magnetic member 2a in a prescribed direction, and it is formed by a special etching method. The guard band member 4b may have a cross-sectional elliptical shape.

Figure 8:
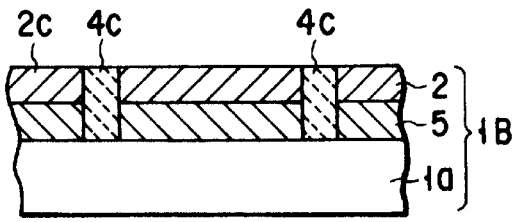
FIG. 8 is a vertical cross sectional view which shows the magnetic disk of another embodiment.

In addition, as shown in FIG. 8, the cross-sectional rectangular guard band member 4c may be provided up to a boundary ground layer 5 below the magnetic member 2c and the substrate 1. The guard band member 4c can be formed on a medium having the ground layer 5, thereby realizing high density recording and reproduction.

Figure 9:
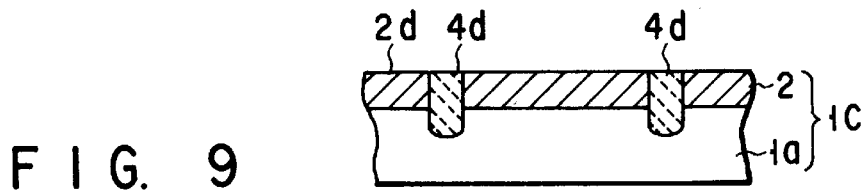
FIG. 9 is a vertical cross sectional view which shows the magnetic disk of another embodiment.

In addition, as shown in FIG. 9, the cross-sectional elliptical guard band member 4d may be formed so as to go into a portion of the substrate 1a. Such guard band 4d can be formed midway up the substrate 1a of the medium 1 without the ground layer, thereby realizing high density recording and reproduction.

In accordance with the present invention, side fringe is greatly reduced by separating the recording magnetic members from each other by the hard guard band member, so narrower spacing becomes possible. Moreover, since high durability can be obtained without the protective film, narrower spacing and bit pitch becomes possible. Therefore, synthetically, the present invention greatly contributes to high density magnetic recording. Furthermore, a magnetic disk is provided in which a hard guard band member can be formed and a manufacturing method can be provided without an increased price.

In addition, in accordance with the present invention, degree of freedom of the film provided in the lower part of the recording layer is high, and in the case of an in-plane medium, it is easy to set the recording magnetic film so as to have a thickness corresponding to high density recording by arranging the oriented control film, and in the case of a perpendicular medium, it is easy to strengthen the recording/reproducing magnetic field by arranging a high-permeability layer on the lower part of the recording layer. Moreover, since CSS resistance can be greatly improved by adopting the hard guard band member, the present invention can be applied to the contact recording method in the future. Furthermore, the magnetoresistance effect-type head can be made to contact with the disk surface by adopting an insulating guard band member, so synthetically, the present invention greatly contributes to higher density magnetic recording.

The following describes the magnetic recording apparatus and the magnetic head with reference to FIGS. 10 through 13.

Figure 10:
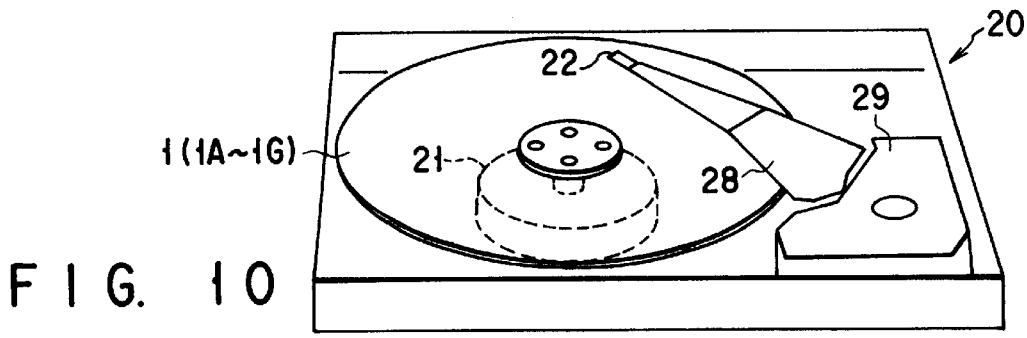
FIG. 10 is a general schematic perspective view of a magnetic recording apparatus.

As shown in FIG. 10, the disk 1 is placed on a turn table of a magnetic recording apparatus 20 so as to be rotated by a spindle motor 21. A magnetic head 22 is provided at an end of an arm 28. The base end section of the arm 28 is supported by a voice coil motor (VCM) 29.

Figure 11:
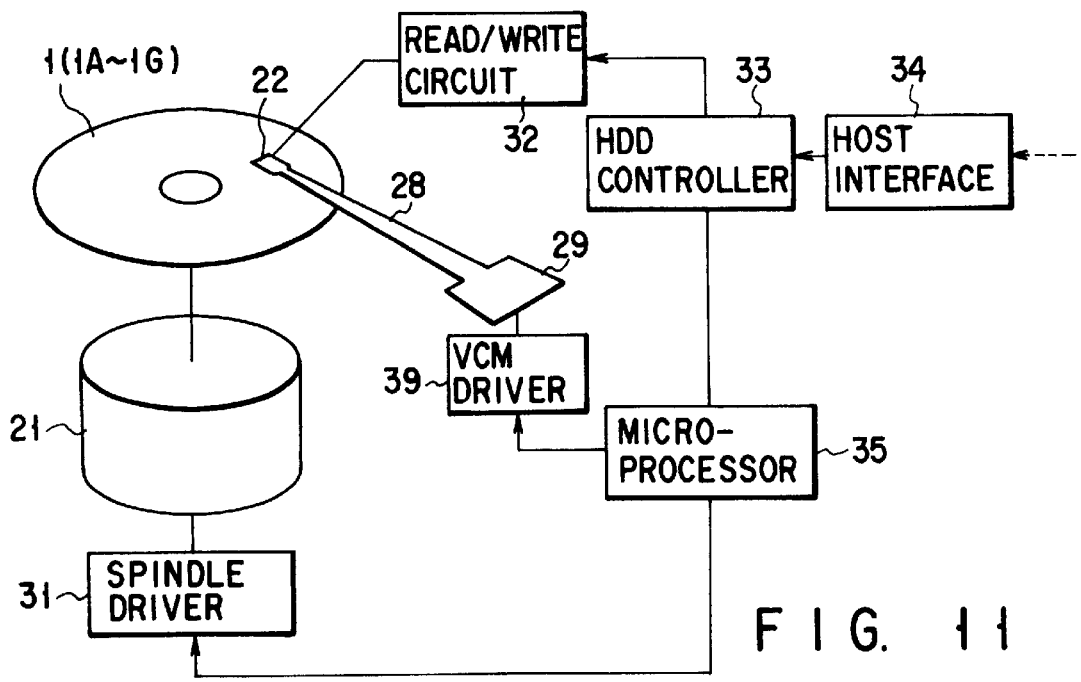
FIG. 11 is a block diagram which shows an arrangement of a control system in the magnetic recording apparatus.

As shown in FIG. 11, a microprocessor 35 is connected to a spindle driver 31, a VCM driver 39 and a hard disk drive (HDD) controller 33 so as to transmit a control signal respectively to them. The microprocessor 35 performs both a servo control and data processing. For example, the microprocessor 35 performs sampling 3000 times per second so as to control the operation of the VCM 29, and generates a digital signal for the servo control. The digital signal is subject to D/A conversion so as to be used for controlling the VCM driver 39. As a result, the VCM 29 as an actuator of the arm 28 is driven so that the magnetic head 22 is made to come close to or contact a desired position of the recording surface of the disk 1. Moreover, the microprocessor 35 controls the motor 21 and the spindle driver 31 so that the disk 1 is rotated at a desired speed.

In addition, a write/read process is performed by the microprocessor 35. Namely, the microprocessor 35 exchanges a signal with the HDD controller 33, and changes data to be recorded on the disk 1 into a signal, and transmits the signal to the magnetic head 22 through a read/write circuit 32. Meanwhile, the HDD controller 33 is connected to an external host computer (not shown) through a host interface 34. The data to be recorded on the disk 1 are inputted to the HDD controller 33 from the host computer, and the inputted data are transmitted to the microprocessor 35. Then, the data are processed in the microprocessor 35, and they are returned to the HDD controller 33. Here, in the case where a plurality of heads are provided on the arm 28, the microprocessor 35 performs multi-processing on them.

The following explains the magnetic head with reference to FIGS. 12 and 13.

FIG. 12 schematically shows a principle arrangement of the magnetic head unit 22. The magnetic head unit 22 is provided with a recording head 23 and a reproducing head 24. The magnetic head 23 is an inductive type head using a thin film or thin films and a coil. When a recording current according to a data signal is supplied from a recording amplifier (not shown) through a terminal 25 to the recording head 23, the recording head 23 records the data signal on the recording disk 1.

The reproducing head 24 is also the huge magnetoresistance effect-type head (GMR head) using the spindle valve-type magnetoresistance element (MR element). The reproducing head 24 reproduces the data signal recorded on the magnetic disk 1 and a servo signal previously recorded prior to recording of the data signal. A sense current is supplied from a sense circuit (not shown) through a terminal 26 to the MR element of the reproducing head 24. Moreover, a change in the magnetic reluctance of the MR element due to a magnetic field based upon a signal recorded on the magnetic disk 1 is taken out from the terminal 26 as a voltage change due to the sense current, and this voltage signal is applied to a reproducing amplifier (not shown).

As shown in FIG. 13, the spindle valve-type MR element of the recording head 23 is provided with a pin layer (first magnetic layer) 23a, a free layer (second magnetic layer) 23b, a non-magnetic electrically conductive layer 23c and a pair of leads 23d. The magnetization of the pin layer 23a is fixed in the perpendicular direction of the surface of the magnetic disk 1. The magnetization of the free layer 23b is changed by an applied magnetic field. The non-magnetic electrically conductive layer 23c is inserted between the pin layer 23a and the free layer 23b. The pair of the leads 23d are connected to both ends of the track widthwise direction of the pin layer 23a. The terminals 25 are connected to leads 23d respectively. Each terminal 25 is connected to the read/write circuit 32.

The pin layer 23a and the free layer 23b are made of Co–Fe film, for example, and the non-magnetic electrically conductive layer 23c is made of a Cu film, for example. The free layer 23a is oriented in the track widthwise direction so that its magnetization is arranged parallel to the surface of the magnetic disk. When the signal magnetic field is applied to the MR element of the recording head 23, the magnetization direction of the free layer 23b is determined, and the electric resistance of the MR element between the pair of the leads 23d is changed according to the relationship between the magnetization directions of the free layer 23b and the pin layer 23a. This change in the electric resistance is a huge magnetoresistance effect.

The following explains another preferable embodiment of the present invention with reference to FIGS. 14 through 19.

In FIG. 14, the reference symbol 1a represents a substrate, 2 represents a recording layer, 11 represents a magnet member, and 12 represents a recording magnetic member. In the present embodiment, a CoPt film with a thickness of 20 nm as the recording magnetic member 12, a TbCo film with a thickness of 20 nm as the magnet member 11 and glass substrate with a diameter of 2.5 inches as the substrate 1a were used.

The recording layer 2 is provided with the magneto members 11 and the recording magnetic members 12 alternately in the radial direction of the disk. The recording magnetic members 12 form the recording tracks T1, T2, . . . Tn, and the magnet members 11 form areas between the recording tracks M1, M2, . . . Mn for generating DC current magnetic field. The magnetization direction of the recording magnetic member 12 is parallel to the recording tracks in the case of a longitudinal recording medium, and is perpendicular to the film surface in the case of a perpendicular magnetic medium.

Meanwhile, the magnetization direction of the magnet member 11 is perpendicular to the film surface in the case of the operation by the magnetoresistance head of the transverse energizing method, and is perpendicular to the recording tracks T1, T2, . . . Tn in-plane film in the case of the operation by the magnetoresistance head of the longitudinal electric method. Here, in the transverse energizing method or the longitudinal energizing method, it is preferable that the magnetization directions of the magnet members 11 are set in the opposite direction per track.

The magnetic disk 1D shown in FIG. 14 can be manufactured by the following method, for example.

First, the plane CoPt film is formed on the plane glass substrate 1a by the sputtering method, and the $SiO_2$ film is formed so as to have a thickness of 10 nm. Next, the $SiO_2$ film is spin-coated with a resist, and the resist is concentrically exposed by using a laser exposing unit used for original cutting of an optical disk, and the resist is patterned by development processing.

Next, the substrate 1 is placed in the RIE unit, and the $SiO_2$ film is etched by using $CHF_3$ gas, for example. Moreover, the resist pattern is removed by ashing, and the $SiO_2$ pattern is formed on the CoPt film. Then, the CoPt magnetic film is etched by the RIE unit using a mixed gas of chlorine and boron trichloride, for example, extendingly to the substrate surface.

Furthermore, a TbCo perpendicular magnetization film with a thickness of 20 nm having high coercive force (about 10 kOe) which is magnetically in the proximity of compensation composition (Tb; about 22 atom %) is formed by the sputtering device, and an excessive TbCo film formed on the recording magnetic member 12 is removed by an ion polishing device so that the magnetic disk D1 was obtained.

Since the TbCo film made of amorphous alloy used as the magnet member 11 has higher hardness than the CoPt film used for the recording magnetic member 12, the disk was evaluated without forming a protective film particularly.

Before the obtained disk is evaluated, the initial magnetization direction of the magnet member (magnet layer) 11 should be set. This was done by using a magneto-optical recording apparatus having an air spindle motor which can be located with high accuracy. First, the disk 1D was placed in the magneto-optical recording apparatus. Then, a recording magnetic field was perpendicularly applied to the film surface, and while the recording magnetic field was being inverted per track, a semiconductor layer beam was converged and projected to the FbCo film 11, and the magnetization of the film was arranged uniformly in the up or down direction over 1 track. Then, the optical head was concentrically sent in the radial direction of the disk at a track pitch of 2 μm. The disk 1D in which the magnetization direction of the magnet layer 11 was set in such a manner was placed in the magnetic recording/reproducing test device and was evaluated.

Figure 15:
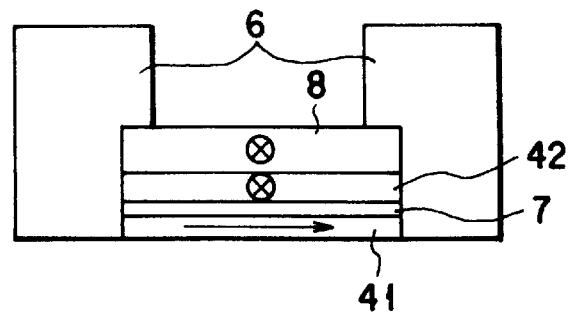
FIG. 15 is a vertical cross sectional view which shows a magnetoresistance effect-type reproducing element which is used for an operation test for proving effects of the present invention.

FIG. 15 is a schematic drawing which shows the magnetoresistance reproducing-type magnetic head used for an evaluation test of the magnetic disk 1D viewed from the ABS surface of the reproducing section. The magnetic head shown in FIG. 15 was specially manufactured for evaluating the magnetic disk 1D of the present embodiment. In the drawing, the symbol 41 represents a magnetization rotating film, 42 represents a magnetization fixing film, 7 represents an electrically conductive non-magnetic film, 8 represents a magnetization sticking film and 6 represents an electrode film.

A CoFe film was used for the magnetization rotating film 41 and the magnetization fixing film 42, Cu for the electrically conductive magnetic film 7, and FeMn for the magnetization sticking film 8 and Cu for the electrode film 6. The magnetization directions of the magnetization sticking film 8 and the magnetization fixing film 42 to be exchange-coupled to the magnetization sticking film 8 were set in a direction from the front face towards the rear face of a sheet in FIG. 15 (namely, a perpendicular direction to a medium surface) after the head disk was subject to the vacuum medium magnetic field medium heat treatment.

As to the head which was actually used, a CoZrNb film which is commonly used for an insulating film, a magnetic shield and a recording lower magnetic pole was formed, and an NiFe upper magnetic pole was formed in the upper section through a recording gap, and a width of the recording/reproducing track was 2 μm. The magnetic disk of the present invention was rotated so that the magnetic head flew by 0.04 μm, and the recording/reproducing test was made. As a result, in the magnetic disk of the present embodiment, since a magnetic signal from the recording magnetic member 12 was different from a magnetic signal from the magnet member 11 in the non-recording state, the stable tracking operation could be performed even in the case where servo writing was not performed. This proved one effect of the present invention.

Figure 16:
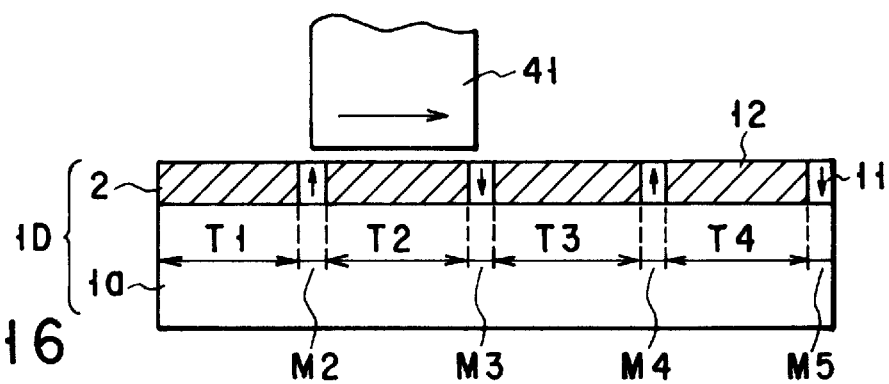
FIG. 16 is a schematic drawing which shows a relationship in magnetization directions between the magnetic disk and the head in operating according to the second embodiment.
Figure 17:
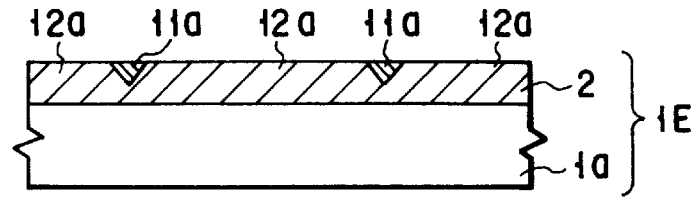
FIG. 17 is a vertical cross sectional view which shows a recording track portion of the magnetic disk according to another embodiment of the present invention.

Next, as shown in FIG. 16, information was recorded and reproduced on the magnetic disk 1D of the present embodiment by using the above-mentioned magnetoresistance reproducing-type magnetic head. FIG. 16 is a cross-sectional schematic drawing which shows a state of the magnetization rotating film 41 and the recording medium which track on the non-recording track in operation.

When a recording signal was applied to the recording magnetic pole and transverse energization was supplied to the reproducing head electrode 6 (an electric was supplied in an opposite direction to an arrow in the magnetization rotating film 41 in FIG. 15), the recording/reproducing operation was performed. The magnetization direction of the magnetization rotating film 41 on the track T2 was arranged in a direction of a leakage magnetic flux from the magnet members M2 and M3. This is the magnetization direction where a symmetric waveform can be reproduced.

Next, when the recording operation was performed, the magnetization of the magnetization rotating film 41 was rotated according to a leakage magnetic flux from a magnetization inverting section (which is perpendicular to the medium surface, and up or down direction). As a result, the resistance was changed, and a reproduced signal having a symmetrical waveform was obtained. When a sense current was increased, the strength of the reproduced signal was increased linearly, and the magnetization directions of the sense current magnetic field and the magnetization sticking film 8 coincided with each other, so a change in the magnetization direction of the magnetization sticking film 8 was not observed.

In the case where the operation was performed on the track T3 which is adjacent to the track T2, the magnetization direction of the magnetization rotating film 41 was opposite to on track T2, but the reproducing operations on the tracks T2 and T3 are equivalent, so the recording/reproducing operation could be performed without any trouble.

Next, the reproducing head was gradually sent in the radial direction of the disk from recorded track to the non-recording track, and an off-track characteristic was examined. As a result, it was clear that no signals were generated when rerecording head was sent at a track pitch of 2 μm, and the disk 1D of the present embodiment is effective in reducing a side fringe. Moreover, the CSS test was repeated 5000 times, but wear of the medium surface was not confirmed. However, a lubricant was applied to the medium surface, and it was subject to the CSS test. According to this test, it was clear that if the magnet member 11 is harder than the recording magnetic member 12, the magnet member 11 functions as a guide rail and improves the CSS resistivity.

In addition, in order to improve the CSS resistivity, a it is effective to use a ferrite magnet member as the magnet member 11 instead of TbCo, and in this case, such practical CSS resistivity as about 50 thousand path can be expected without a protective film. Moreover, it is effective in narrower spacing. In the case of the Thou magnet layer used in the above embodiment, it is practically preferable that the SiO$_2$ protective film with a thickness of about 10 nm is provided on the medium surface.

COMPARATIVE EXAMPLE

The results of the experiments which clarified the effects of the present invention were described above, but as a comparative example, a magnetic disk without a magnet member was manufactured by the conventional method, and this disk was evaluated similarly to the disk 1D of the above embodiment. The arrangement of the comparative disk is so that a CoPt recording layer of 20 nm and an SiO$_2$ protective layer of 10 nm were formed on a glass substrate by the sputtering method, and the lubricant which is the same one used for the disk 1D was applied thereto. The conditions of the disk operation test were the same as the disk 1D except that the head fly amount was 0.03 μm and the spacing between the head and media was changed.

A magnetic field which leaks out of the comparative disk to the magnetization rotating film 41 of the head is random in the non-recording state, so the magnetization direction of the magnetization rotating film 41 is arranged in the direction of the leakage magnetic fluxes of the magnetization sticking film 8 and the magnetization fixing film 42, namely, a perpendicular direction to a sheet surface (rear to front) in FIG. 15. As a result, in the case where a string of recording magnetic domains were reproduced, when the magnetic field from the comparative disk medium directed from the front to the rear of the sheet surface in FIG. 15, the magnetization of the magnetization rotating film 41 was rotated so that a reproduced signal was obtained. However, in the case where the magnetic field directed from the rear to the front, the magnetization of the magnetization rotating film 41 was not rotated, so a signal was not obtained. Namely, in the comparative disk, the reproduced signal output was obtained, but this was only the output corresponding to half of magnetization transition.

In addition, in the comparative disk, since no tracking information could not be obtained from a track in a non-recording state without servo writing, track displacement occurred and a side fringe became larger. As a result, crosstalk of an excessive noise signal from an adjacent track became larger.

In the above embodiment and comparative example, the CpPt film as the recording magnetic layer, TbCo film as the magnet layer, $SiO_2$ as the protective film were used, but present invention is not necessarily limited to the above materials, so various materials can be used, namely, a metal such as Al as the substrate, CoCrTa, CoNiPt, CoCr, Ba ferrite, etc. as the recording magnetic member 12, a ferrite, SmCo, NdFe, MnBi, etc. as the magnet member 11, and Cr, etc. as the protective film can be used. Moreover, an oriented control layer such as Cr, a high permeable layer such as NiFe, etc. may be arranged as the ground of the recording magnetic member 11.

In addition, deformed examples whose cross-sectional shape of the magnet member is varied are provided. However, besides the rectangular shape, a V shape or semicircular shape may be applicable.

Figure 18:
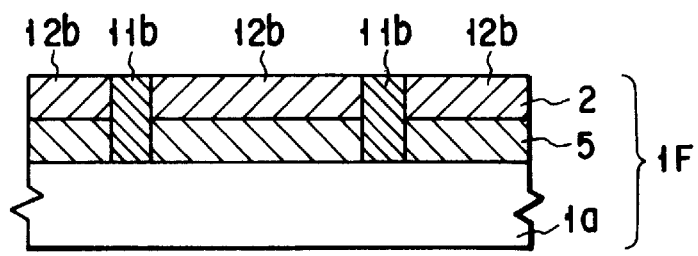
FIG. 18 is a vertical cross sectional view which shows a recording track portion of the magnetic disk according to another embodiment of the present invention.
Figure 19:
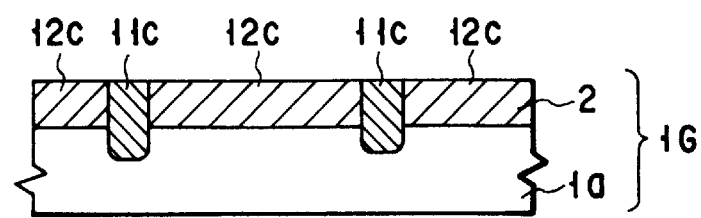
FIG. 19 is a vertical cross sectional view which shows a recording track portion of the magnetic disk according to another embodiment of the present invention.

In addition, in the magnetic disk 1D of the embodiment, a depth of an area to which the magnet member 11 is provided was the same as the thickness of the recording magnetic layer 12, but the depth (thickness) of the magnet member 11 is not necessarily the same as the thickness of the recording magnetic layer 12. For example, in a disk 1E of FIG. 17, the depth of the magnet member 11 is set smaller than the thickness of the recording magnetic member 12a. Moreover, as shown in FIG. 18, in a disk 1F having an intermediate layer (ground layer) 5 between a substrate 1a and a recording layer 2, the depth of a magnet member 11b may be a total of the film thicknesses of the intermediate layer 3 and a recording magnetic member 12b. Furthermore, in a disk 1G shown in FIG. 19, a depth of the magnet member 11c is made deeper than member 12.

In addition, the same effect can be obtained in the case of the magnetoresistance effective-type reproducing element other than one having the spindle valve arrangement, such as an anisotropy magnetoresistance film, an artificial grid-type multi-layered film and a granular film. Namely, the same effects can be obtained for the magnetoresistance effect-type element, which requires any operation point bias in order to obtain symmetry of a reproduced signal.

When the magnetic disk of the present embodiment is used, the magnetic recording/reproducing apparatus having the magnetoresistance effect-type reproducing head can be energized by a large sense current. Therefore, the high strength of the reproduced signal can be obtained, and satisfactory symmetry of the reproduced signal waveform can be obtained. For this reason, the reproducing operation can be performed stably at lower error rate, and since the structure of a reproducing head is simplified, a head can be manufactured at a lower price. Furthermore, accompanying functions are obtained. Namely, the recording operation can be performed with less side fringe, and a stable tracking operation can be performed, thereby becoming easy to narrow tracks, and it is possible to narrow spacing.

In accordance with the magnetic disk of the present invention, since a suitable operation point bias is applied to the magnetoresistance effect-type head by a medium magnetic field, a stable reproducing operation with a symmetrical waveform can be performed even if a simple reproducing element structure is used, and thus manufacture of a reproducing element becomes simple and easy.

In particular, without servo writing, a stable tracking operation can be performed with high accuracy, and the recording operation with less side fringe can be realized, and it becomes easy to narrow spacing. Therefore, synthetically, the magnetic disk of the present invention greatly contributes to higher density and higher performance of magnetic recording.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

Additional advantages and modifications will readily occur to those skilled in the art. Therefore, the invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed as new and desired to be secured by Letters Patent of the United States is:

1. A magnetic disk comprising:

a substrate;

recording track sections made of a magnetic member for recording and reproducing information magnetically, said recording track sections being provided on said substrate; and a guard band member provided between said recording track sections adjacent to each other so that they are substantially continued in a track direction, said guard band member being harder than said magnetic member and being made of a non-magnetic material;

wherein one of:

said magnetic member is not provided in a lower area of said guard band member having a thickness substantially equal to a thickness of the magnetic member forming said recording track sections, whereby magnetic anisotropy is applied to the track direction, and a fluctuation in a reproduced signal in the recording track sections becomes small and another magnetic member with a different thickness from said magnetic member forming said recording track sections is provided in a lower area of said guard band member having a thickness substantially less than the thickness of the magnetic member forming said recording track sections, for adjusting magnetic anisotropy of the recording track sections: and the disk surface formed by said magnetic member forming said recording track sections and said guard band member has a flat surface, whereby an antifriction protective layer is not needed on the recording track sections.

2. The magnetic disk according to claim 1, wherein electric resistance of said guard band member is larger than electric resistance of the magnetic member forming said recording track section.

3. The magnetic disk according to claim 1, further comprising:

a ground layer composed of an NiP plating layer, a Cr-oriented control layer or an NiFe soft magnetic layer between said magnetic member and said substrate, wherein a thickness of said guard band members is substantially same as a thickness of a total thickness of said ground layer and said magnetic member.

4. The magnetic disk according to claim 1, wherein said guard band members are made of oxide such as $SiO_2$, $Al_2O_3$ and $TiO_2$, silicon such as $Si_3N_4$, AlN and TiN, carbide such as TiC, boride such as Bn or C, CH or CF polymeric compound.

5. The magnetic disk according to claim 1, wherein a width of said recording track section on the disk surface is 1.8+0.1 μm, a width of said guard band member is 0.2+0.1 μm, and an interval of pitches of said recording track section is 2.0+0.1 μm.

6. The magnetic disc according to claim 1, wherein each of said recording track section and said guard band member form an exposed disc surface.

7. The magnetic disc according to claim 1, wherein the disc surface is covered with a protective film to protect each of the recording track section and the guard band member.

8. The magnetic disc according to claim 1, wherein said magnetic member is formed of an electrically conductive material formed by a multi-source magnetron sputtering method.

9. The magnetic disc according to claim 8, wherein said electrically conductive material is CoPt containing 20 atomic % of Pt.

10. The magnetic disc according to claim 1, wherein the magnetic member in said recording track section has a shape magnetic anisotropy in the track direction.

* * * * *

UNITED STATES PATENT AND TRADEMARK OFFICE
CERTIFICATE OF CORRECTION

PATENT NO. : 6,014,296
DATED : January 11, 1999
INVENTOR(S) : Katsutaro Ichihara, et al.

It is certified that error appears in the above-identified patent and that said Letters Patent is hereby corrected as shown below:

Title page,
Column 1, Item [54], the Title of the invention is listed incorrectly. It should read as follows:
[54] MAGNETIC DISK WITH A GUARD BAND ARRANGEMENT

Signed and Sealed this

Twenty-eighth Day of August, 2001

*Attest:*

*Attesting Officer*

NICHOLAS P. GODICI
*Acting Director of the United States Patent and Trademark Office*